Oct. 3, 1933.          A. H. NELLER          1,928,819
ANIMAL STALL
Filed Jan. 7, 1931          3 Sheets-Sheet 2
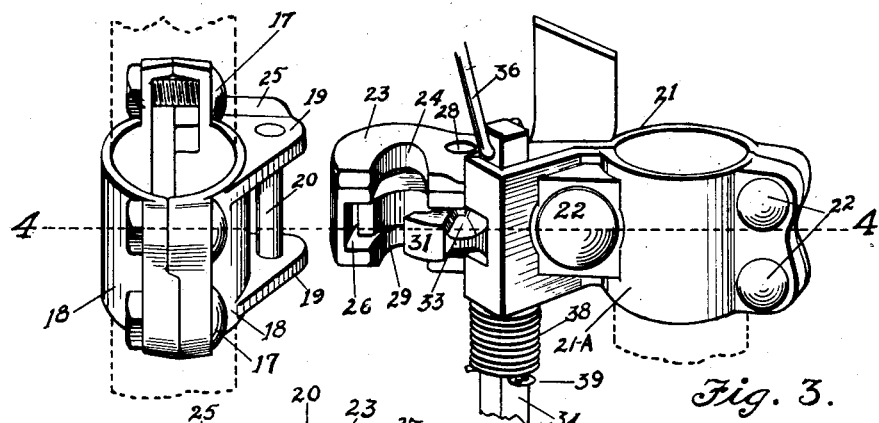
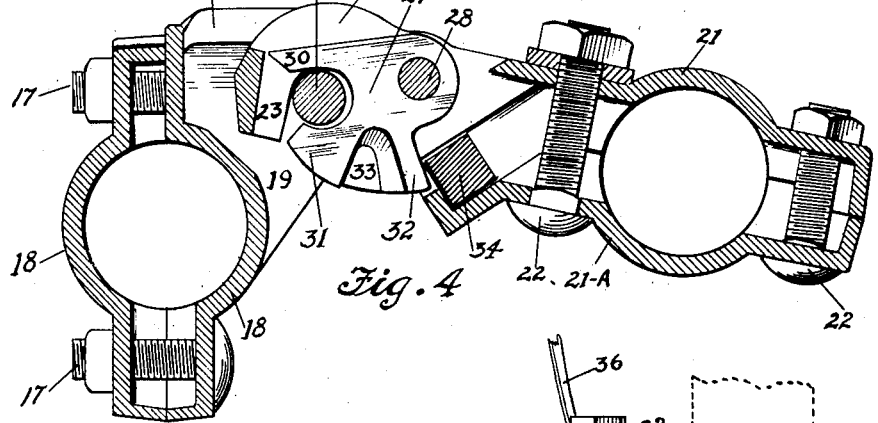
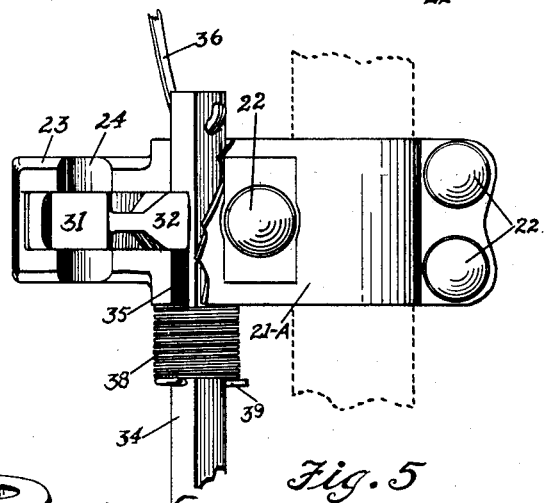
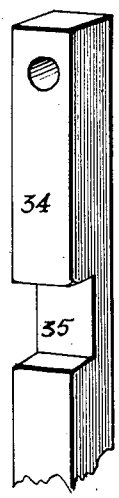
Inventor
Albert H. Neller Oct. 3, 1933.  A. H. NELLER  1,928,819
ANIMAL STALL
Filed Jan. 7, 1931  3 Sheets-Sheet 3
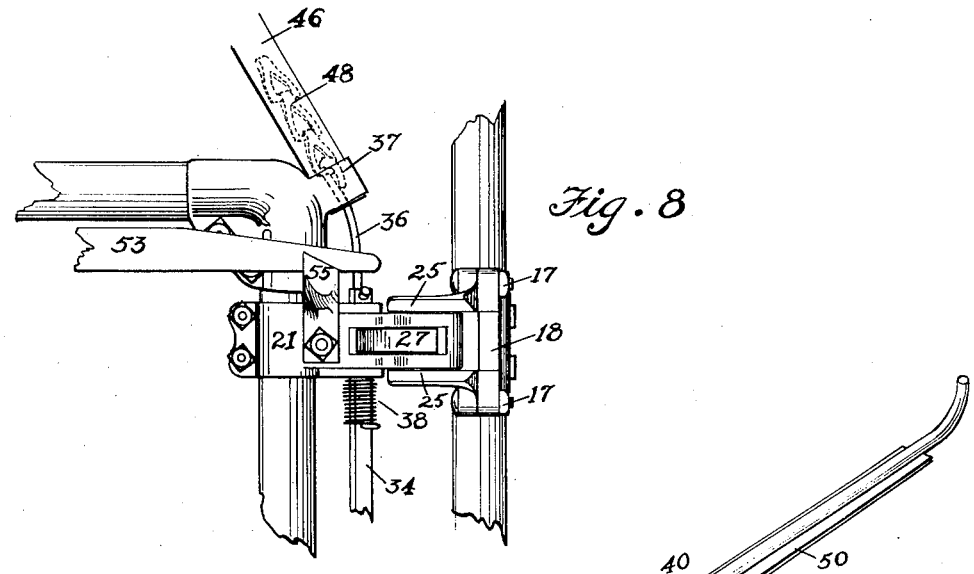
Fig. 8
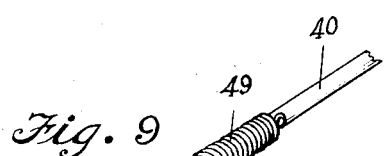
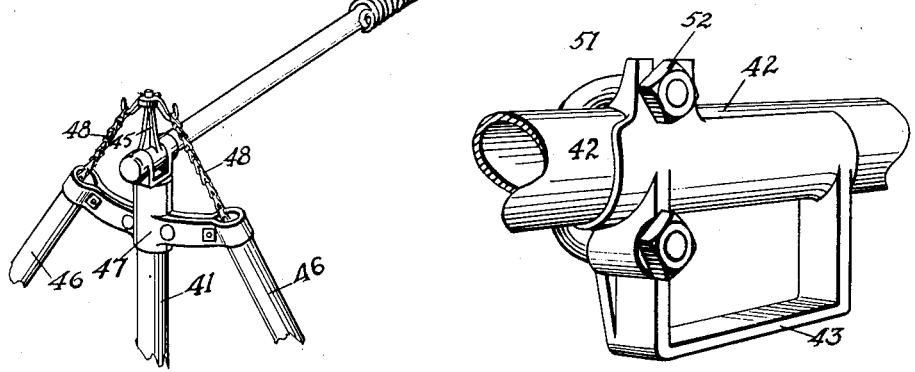
Fig. 9
Fig. 10
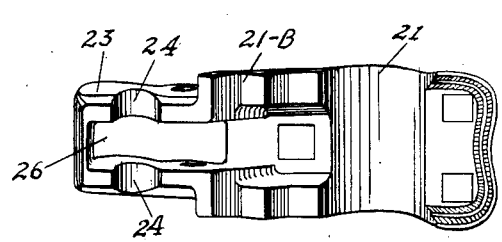
Fig. 11
Inventor
Albert H. Neller Patented Oct. 3, 1933

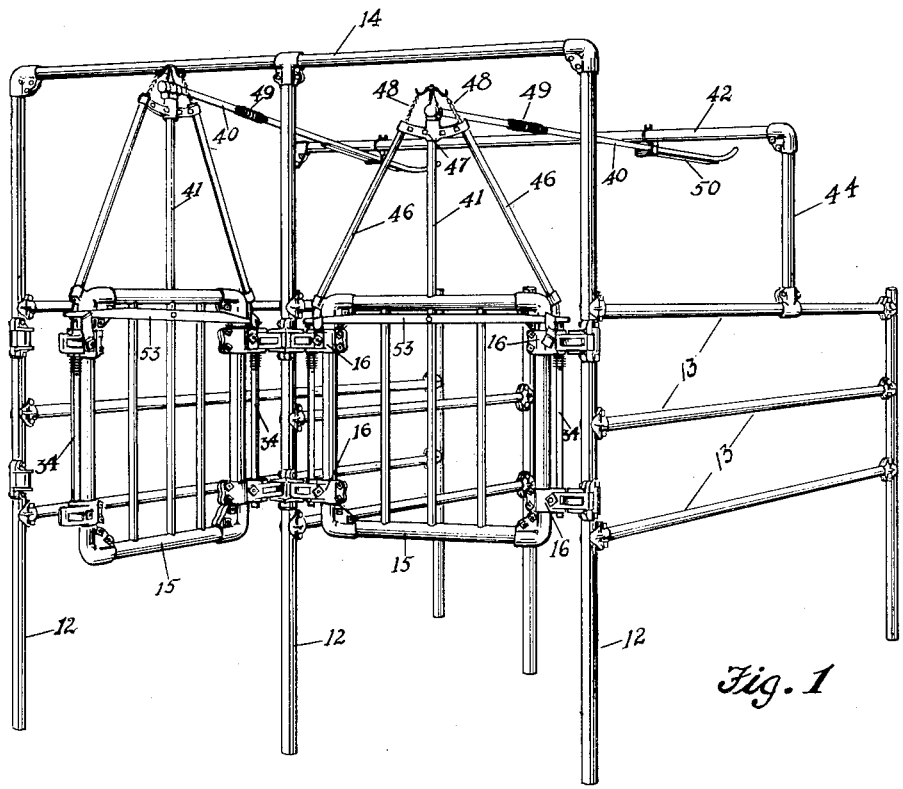

1,928,819

UNITED STATES PATENT OFFICE 1,928,819

ANIMAL STALL

Albert H. Neller, Fairfield, Iowa, assignor to The Louden Machinery Company, Fairfield, Iowa, a corporation of Iowa Application January 7, 1931. Serial No. 507,051

15 Claims. (Cl. 119—27)

This invention relates to improvements in animal stalls, particularly to the type of stalls for confining animals while they are being milked. In dairies milking a large number of animals, it has been found practical to milk the animals by machinery, and to facilitate the milking operation and improve sanitary conditions, places apart from the regular animal stalls are used. These places are provided with stalls, the animal being driven into the stalls, milked and then released, and a second group of animals are then driven in and the practise continued until the entire herd has been milked. By adopting this method, considerable savings are effected in that fewer milking machines and stalls are required. My invention may also be used with animal pens, where it is desirable to have a gate which may be opened on either side.

The object of the invention is to provide a stall having a gate which may be opened by an operator in the rear of the stall so that the animal confined therein may pass through the opening thus made.

Another object of the invention is to provide a gate in the stall which may be opened on either side, thereby enabling an operator to control the direction of the animal when it is released.

The above and other objects and advantages will appear from a consideration of the following description in conjunction with the accompanying drawings in which Fig. 1 is a perspective view of two stalls, the gate of one being partially open and the other closed.

Fig. 2 is a diagrammatic plan view of stalls located in a building showing the gates of the stalls swung out from one side of the stalls in full lines and swung out from the opposite sides in dotted lines.

Fig. 3 is a perspective view of the combined latch and hinge connection between the gate and the stall, viewing it from the interior of the stall.

Fig. 4 is a horizontal sectional view on line 4—4 of Fig. 3.

Fig. 5 is an elevation of the latch connection with a portion of the connecting couplings broken away.

Fig. 6 is a perspective view of the latch member.

Fig. 7 is a perspective view of the upper portion of the slide bar.

Fig. 8 is a detail view showing the front elevation of a safety member for the latch connection.

Fig. 9 is a perspective of the operating lever and connection to the stall gate.

Fig. 10 is a detail view which will be hereafter explained.

Fig. 11 is an enlarged view of the interior side of one of the coupling members.

Referring to the drawings, these show a stall having posts 12, partition members 13 and a horizontal member 14 connecting the posts in the front end of the stall. The front of the stall consists of a closure or gate 15, attached to the posts 12 by means of four combined hinge and latch connections 16, two of the same being placed on each side of the gate, which permits the gate to be opened outwardly on either side, the connections acting as a latch on the opened side and as a hinge on the opposite side.

Rigidly secured on the posts 12 by means of bolts 17 are clamping members 18, having a pair of spaced projections 19 extending toward the gate. A pin 20 is positioned between the projections 19, the ends of the pin being secured to them. This pin forms the pivot or hinge pin when the connection is used as a hinge and when used as a latch the pin is disengaged from the latch member and the gate thereby is released from the post. Mounted on the sides of the gate 15 are pairs of clamping members 21—21A, secured at one of their ends to the gate by means of bolts 22. The opposite end 23 of the clamping member 21 is extended outwardly from the gate, and is adapted to enter the recess between the projections 19. The end 23 has a vertical recess 24 on its inner side, in which the pin 20 is adapted to fit when the connections are in engagement. The projections 19 are provided with oppositely extending lips 25 to facilitate the entrance of the end 23 into the recess between the projections.

The outer end 23 is provided with a horizontal slot 26 in which a latch member 27 is pivoted by means of a pin 28. The latch member has a vertical recess 29 and in this recess the pin 20 is adapted to fit, the sides formed by the recess being designated 30 and 31 respectively. A shoulder 32 is formed on the latch member and the upper surface of the latch member between the shoulder 32 and the side 31 is horizontally recessed at 33, the side of the recess adjacent the shoulder being sloped toward it.

The clamping members 21 and 21A are preferably made of castings. The member 21 is vertically recessed at 21B intermediate its ends, and the member 21A has a similar recess so that when the castings are coupled together a square vertical opening is provided. In this opening a square sliding bar 34 is inserted, the bar being sufficiently long to extend thru both hinge and latch connections on one side of the gate. A portion of the bar 34 is cut away, as at 35 and a corresponding portion of the casting 21A is also removed to permit the shoulder 32 of the latch to pass through the cut away portion 35 of the bar 34. One end of a connecting member 36 is passed through the upper end of the rod to keep it from sliding through the hinge and latch connection and the opposite end of the member 36 is provided with a hook 37 which will be hereafter referred to.

A coiled spring 38 is placed over the bar 34 immediately below the upper hinge and latch connection and is secured thereon by means of a pin 39. This pin serves the further purpose of permitting the bar 34 to be raised sufficiently so that the cut away portion 35 of the bar is opposite the cut away portion on the casting 21A and no further, thereby allowing the shoulder 32 on the latching element to pivot through the bar 34. The spring 38 acts to force the bar downwardly, after the bar has been raised.

The hinge and latch connections on my device are all alike and to open the gate, assuming it is locked, it is necessary to raise the bar 34 on the side desired to be opened, and push the gate outwardly. When the bar 34 is raised, the cut away portion 35 on the bar is opposite the shoulder 32 on the latch member, and as the gate is moved outwardly, the hinge pin 20 engages the side 31 of the recess in the latch member and causes it to pivot, the shoulder 32 on the latch member passing through the cut away portion 35 in the bar. When the latch member has moved sufficiently on its pivot, the hinge pin 20 passes out of the recess 29, allowing the gate to be swung open, and that part of the bar 34 immediately above the cut away portion moves downwardly into the horizontal recess 33 on the latch member. When the gate is closed, the side 30 of the recess 29 on the latch member contacts with the hinge pin 20, causing the latch member to pivot, and the hinge 20 enters the recess 29, and in turn passes into the vertical recess 24 in the extended end 23 of the clamping member 21, so that the hinge pin is entirely surrounded with a bearing surface. In the meantime, the bar 34 has passed over the sloping side of the horizontal recess 33 in the latch member and over the shoulder 32 and moved downwardly so that the shoulder 32 abuts against the bar 34. The latch member is thereby locked until the gate is to be opened. The hinge and latch connections on the side of the gate opposite to the one opened have turned on the hinge pin 20 as the gate was opened and closed, the connection in this instance acting as a hinge.

To enable an operator in the rear of the stall to open the gate, I have provided a horizontal lever 40, one end of which is journaled in a bearing on a support 41 extending upwardly from the gate 15. The opposite end of the lever is curved to provide a hand-hold for rocking the lever at the journaled end. Intermediate its length, the lever 40 is suspended from a cross bar 42 by means of a member 43 (Fig. 10), and the cross bar is supported by uprights 44, which are clamped on the partition members 13. Rigidly secured to and projecting upwardly from the journaled end of the lever 40, is an arm 45 having hook portions on opposite sides thereof. The support 41 is braced by tubular members 46 extending from the upper corners of the gate 15 to a point adjacent the upper end of the support 41, to which they are connected by means of a bracket 47. Chains 48 are attached at one end to the hook portions on the member 45, and inserted in the tubular brace members 46, and the opposite end is attached to the hook 37 of the member 36. It will be apparent that an operator, by rocking the lever 40 in the proper direction, can exert a pulling force on the chain and can thereby raise the bar 34 on either side of the gate 15 as desired. To prevent the lever 40 from being bent by striking the posts 12 when the gate is opened beyond the post 12, I provide a joint by breaking the lever at a point approximately where the lever will strike the upright 12, and connect the broken ends together with a coiled spring 49.

To maintain the lever from rocking in the bearing, except when intentionally rocked by an operator, I secure a flat bar 50 to the bottom of the lever adjacent to the curved end thereof, and the lever and bar are extended through an opening in the member 43. It will be noted that the width of this opening is greater than the height thereof. The width of the bar 50 is less than the width of the opening so that it can slide freely therein, but its width is greater than the height of the opening so that the lever can only be rocked sufficiently to operate the chains 48. When the lever is released by the operator the bar 50 will rest in the opening and the lever will thereby resume an upright position. The member 43 may be secured to the cross bar 42 in any suitable manner and I employ for this purpose a U bolt 51, with nuts 52 applied to the threaded ends of the bolt.

A guard 53 is pivoted on the central filler bar of the gate at 54 and it extends horizontally across the gate, the ends of the same being directly over the top of the vertical bar 34. As the connections on one side of the gate are unlatched the bar 34 contacts with the end of the guard and raises it slightly and the guard moves on its pivot so that the opposite end bears down on the top of the vertical bar 34 on the opposite side of the gate, thereby preventing the connections on that side from being inadvertently unlatched. Guide members 55 are attached to the hinge and latch connections to maintain the ends of the guard in position over the vertical bar 34.

Referring now to Fig. 2, 56 represents the walls of a building or enclosure in which the stalls are placed, the building having doors 57. The space between the wall 56 and the closed end of the stall provides a passageway for the animal when released from the stall, and when the closure or gate is opened the passageway is blocked in one direction by the closure so that the animal moves along the passageway in the opposite direction. The animal to be milked is directed into a stall, and after the milking operation is completed, the operator in the rear of the stall can control the direction of the animal when released from the stall by opening the gate on the proper side. Spaces 59 are provided adjacent the stalls for milking machines which may be of any well known type and are therefore not shown in the drawings.

Having described the invention, what is claimed and is desired to secure by Letters Patent therefore, is:—

1. A stall for animals comprising a pair of vertical posts spaced a distance apart, partition members connected to said posts, a gate positioned between the posts, releasable means connecting the gate to the posts and means connected with the releasable means to open and close the gate on either side from the rear of the stall.

2. A stall for animals comprising a pair of vertical posts spaced a distance apart having partition members connected thereto, a gate positioned between the posts provided with a support extending above the gate, a bearing on said support, hinge members connecting the gate to the post on one side of the gate and latch members connecting the gate to the post on the other side of the gate, a vertical bar adapted when raised to release the latch members, a horizontal lever rockably journaled in the bearing on the support adapted to be moved forward and back to open and close the gate and connecting means between the horizontal lever and vertical bar adapted to raise the bar when the lever is rocked.

3. A stall for animals comprising a pair of vertical posts spaced a distance apart having partition members connected thereto, a gate positioned between the posts provided with a support extending above the gate, a bearing on said support, combined hinge and latch connections between the gate and the posts, two vertical bars, one on each side of the gate adapted when raised to release the latch connections, a horizontal lever rockably journaled in the bearing on the support adapted to be moved forward and back to open and close the gate and connecting means between the horizontal lever and vertical bars to raise either of the bars when the lever is rocked.

4. A stall for animals comprising a pair of vertical posts spaced a distance apart having partition members connected thereto, a gate positioned between the posts provided with a support extending above the gate, a bearing on said support, combined hinge and latch connections between the gate and posts, two vertical bars one on each side of the gate adapted when raised to release the latch connections, a jointed horizontal lever rockably journaled in the bearing on the support adapted to be moved forward and back to open and close the gate and flexible members connecting said lever and vertical bars to raise either of the bars when the lever is rocked.

5. A stall for animals comprising, a pair of vertical posts spaced a distance apart having partition members connected thereto, a gate positioned between the posts, provided with a support extending above the gate, a bearing on said support, combined hinge and latch connections between the gate and the posts, two vertical bars one on each side of the gate adapted when raised to release the latch connections, a cross support above the stall, a horizontal lever rockably journaled in the bearing on the support and slidably connected to the cross support, means secured to the lever for maintaining the lever from rocking, except when intentionally rocked, and connecting means between said lever and vertical bars to raise either of the bars when the lever is rocked.

6. A stall for animals comprising a pair of vertical posts spaced a distance apart having partition members connected thereto, a gate positioned between the posts provided with a support extending above the gate, combined hinge and latch connections between the gate and the posts, two vertical bars one on each side of the gate adapted when raised to release the latch connections, a cross support above the stall having a member provided with an opening secured thereto, a horizontal lever rockably journaled on the support on the gate and adapted to be moved forward and back through the opening, a bar secured to the lever slidably engageable with the member on the cross support and connecting means between the horizontal lever and vertical bars including an arm secured to said lever and chains attached at one end to the arm and at the opposite ends to the vertical bars.

7. A stall for animals comprising a pair of vertical posts spaced a distance apart having partition members connected thereto, a gate positioned between the posts provided with a support extending upwardly therefrom, said gate having combined hinge and latch connection with the posts, two vertical bars adapted when raised to release the latch connections on each side of the gate, a horizontal lever rockably journaled on the support on the gate and adapted to be moved forward and back to open and close the gate, connecting means between the said lever and vertical bars to raise either of the bars when the lever is rocked and guard means permitting the raising of the vertical bars on but one side of the gate at a time.

8. A stall for animals comprising a pair of vertical posts spaced a distance apart having partition members connected thereto, a gate positioned between the posts provided with a support extending upwardly therefrom, said gate having combined hinge and latch connection with the posts, two vertical bars adapted when raised to release the latch connections on each side of the gate, a horizontal lever rockably journaled to the support on the gate having an arm secured thereon, chains connecting said arm to the vertical bars and a bar pivoted on the gate having ends extending over the upper ends of the vertical bars on each side of the gate adapted to permit but one bar to be raised at a time.

9. The combination with a stall for animals having an opening therein, of supporting members positioned at the sides of the opening, a gate to fit in the opening between the supporting members, and combined hinge and latch connections secured to the sides of the gate and the supporting members each comprising, a hinge pin mounted on the supporting member and a co-operating hinge member mounted on the side of the gate, said hinge member having a vertical recess therein, a latch pivoted in the hinge member having a recess therein to engage the hinge pin, and a slotted vertical bar slidingly mounted in said vertical recess adjacent to the latch adapted when in normal position to abut against the latch and prevent it from turning on its pivot thereby holding the latch in engagement with the hinge pin and adapted, also when raised to permit the latch to turn on its pivot and pass through the slot in the bar thereby releasing the latch from engagement with the hinge pin.

10. The combination with a stall for animals having an opening therein, of supporting members positioned at the sides of the opening, a gate to fit in the opening between the supporting members, and combined hinge and latch connections secured to the sides of the gate and the supporting members each comprising, a hinge pin mounted on the supporting member and a co-operating hinge member mounted on the side of the gate, said hinge member having a vertical recess therein, a latch pivoted in the hinge member provided with a vertical and a horizontal recess, and a slotted vertical bar slidingly mounted in said vertical recess adjacent to the latch adapted when in normal position to abut against the latch and prevent it from turning on its pivot thereby holding the latch in engagement with the hinge pin, and adapted, also when raised to permit part of the latch to turn on its pivot and pass through the slot in the bar, and 11. A stall for animals comprising spaced apart partition members, a closure at one end thereof, combined hinge and latch members connecting the closure to the partition members to permit the closure to swing outwardly from the stall in either direction, and means connected to the closure and the hinge and latch members to open, shut and control the movement of the closure from the rear end of the stall whereby the course of an animal released therefrom can be directed.

12. A stall for animals comprising spaced apart partition members, a closure at one end thereof, combined hinge and latch members connecting the closure to the partition members to permit the closure to swing outwardly from the stall in either direction, a lever connected to the closure to open, shut and control the movement of it from the rear of the stall and means connected to the lever to open the latch members.

13. A stall for animals comprising spaced apart partition members, a closure at one end thereof, combined hinge and latch members connecting the closure to the partition members to permit the closure to swing outwardly from the stall in either direction, a lever connected to the closure to open, shut and control the movement of it from the rear of the stall, a support for the lever and means connected to the lever to open the latch members.

14. The combination of a stall for animals adjacent a passageway comprising spaced apart partition members, a closure at one end thereof, combined hinge and latch members connecting the closure to the partition members adapted to swing the closure outwardly into the passageway in either direction and means connected with the closure adapted to open, shut and control the closure in the passageway from the rear of the stall whereby the course of an animal released from the stall can be directed.

15. The combination of a stall for animals adjacent a passageway comprising spaced apart partition members, a closure at one end thereof, combined hinge and latch members connecting the closure to the partition members adapted to swing the closure outwardly into the passageway in either direction, a lever connected to the closure to open, shut and control the movement of it in the passageway from the rear of the stall and means connected to the lever to open the latch members.

ALBERT H. NELLER.